United States Patent
Palmer

(10) Patent No.: US 11,853,602 B2
(45) Date of Patent: Dec. 26, 2023

(54) TECHNIQUES FOR ADJUSTING A GRANULARITY ASSOCIATED WITH READ DISTURB TRACKING

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 138 days.

(21) Appl. No.: 17/399,771

(22) Filed: Aug. 11, 2021

(65) Prior Publication Data
US 2023/0049678 A1   Feb. 16, 2023

(51) Int. Cl.
*G06F 3/06* (2006.01)

(52) U.S. Cl.
CPC ......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 2007/0005913 A1* | 1/2007 | Muthrasanallur ... | G06F 13/1668 711/157 |
| 2014/0281260 A1* | 9/2014 | Peterson ............... | G06F 3/0679 711/135 |
| 2018/0349040 A1* | 12/2018 | Kabra ................. | G06F 12/0292 |
| 2020/0393972 A1* | 12/2020 | Tomic .................. | G06F 3/0616 |
| 2020/0393974 A1* | 12/2020 | Bahirat ................ | G06F 3/0685 |
| 2021/0034274 A1* | 2/2021 | Muchherla ........... | G06F 3/0619 |
| 2021/0035649 A1* | 2/2021 | Muchherla ........... | G06F 3/0619 |
| 2022/0004335 A1* | 1/2022 | Khan .................... | G11C 16/26 |
| 2022/0137827 A1* | 5/2022 | Schaefer .............. | G06F 3/0679 711/154 |

* cited by examiner

*Primary Examiner* — Sean D Rossiter
(74) *Attorney, Agent, or Firm* — Holland & Hart LLP

(57) ABSTRACT

Methods, systems, and devices for adjusting a granularity associated with read disturb tracking are described. In some examples, a memory system may receive a set of read commands from a host system instructing the memory system to read data stored at a memory array. The memory system may track a quantity of executed read commands corresponding to a first portion of the memory array according to a first granularity and determine whether the quantity of read commands satisfies a threshold. If the quantity of read commands satisfies the threshold, the memory system may adjust the granularity for tracking executed read commands for the first portion from the first granularity to a second granularity. For example, the memory system may increase or decrease the granularity for tracking executed read commands for the first portion. The memory system may use the tracked quantities of executed read commands for read disturb remediation.

20 Claims, 6 Drawing Sheets

TECHNIQUES FOR ADJUSTING A GRANULARITY ASSOCIATED WITH READ DISTURB TRACKING

FIELD OF TECHNOLOGY

The following relates generally to one or more systems for memory and more specifically to techniques for adjusting a granularity associated with read disturb tracking.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
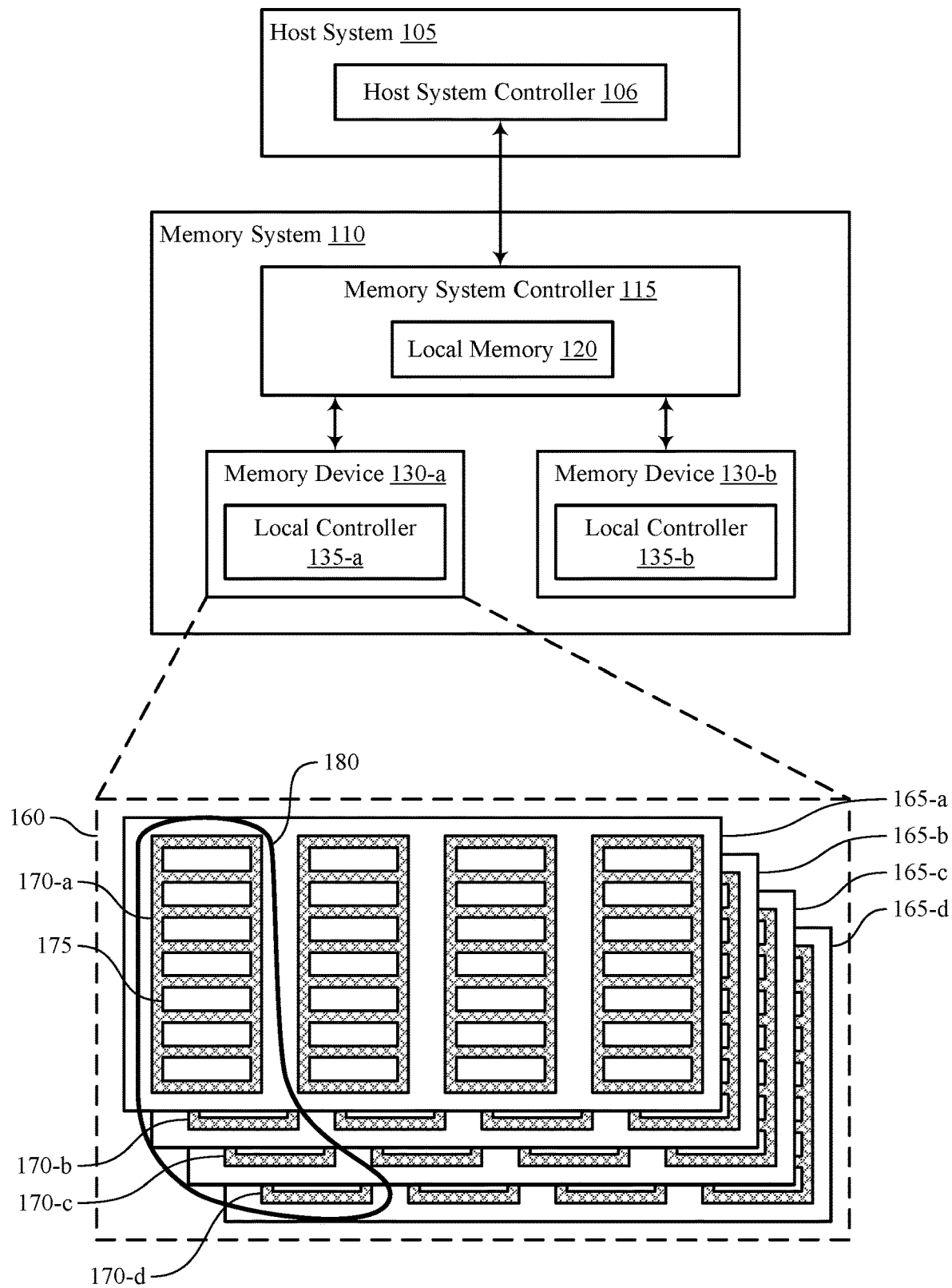
FIG. 1 illustrates an example of a system that supports techniques for adjusting a granularity associated with read disturb tracking in accordance with examples as disclosed herein.

A memory system coupled with a host system may receive multiple read commands from the host system over time. A read command may instruct the memory system to read one or more logic states of one or more memory cells of the memory system. In some examples, repeatedly performing read operations may negatively affect memory cells. For example, during a read operation, the memory system may bias word lines of selected memory cells to a threshold voltage and, in some examples, concurrently bias unselected word lines in the vicinity of the selected word lines to a relatively high voltage (e.g., a voltage above a threshold). But repeatedly biasing the unselected word lines to the relatively high voltage during read operations may result in a change in the programmed logic states of the memory cells associated with the unselected word lines, potentially leading to data reliability issues for the memory cells. To mitigate such negative effects, the memory system may perform read disturb remediation operations for one or more respective portions of a memory array. To perform read disturb remediation operations, the memory system may implement counters to track the quantity of read commands executed at each portion of the memory array. If the quantity of read commands executed at a portion meets a reliability threshold, the data stored at the portion may be moved to another location to avoid data loss (e.g., avoiding the biasing from the executed read commands changing a programmed logic state enough to cause the logic state to be misread or unreadable). However, one or more portions of the memory array may fail to reach the reliability threshold. As such, memory and processing resources allocated for tracking the counters related to read disturb remediation operations corresponding to these one or more portions may be wasted, because the memory system may track read disturb remediation information for portions of a memory array that do not (or may rarely) trigger read disturb remediation operations.

As described herein, the memory system may predict which portions of the memory array may benefit from read disturb remediation operations and apply read disturb remediation operations to one or more of the predicted portions. To do this, the memory system may organize the memory array into portions according to a first granularity and employ a counter for each portion to track the quantity of executed read commands at each portion. In some examples, the first granularity may be relatively coarse. For example, the memory array may be divided into blocks of memory for tracking the executed read commands. The memory system may, for example, periodically (or aperiodically) check the counters and determine if a quantity of executed read commands associated with a portion satisfies a baseline threshold. The baseline threshold may be the reliability threshold divided by some periodicity. If the quantity of executed read commands associated with the portion exceeds the baseline threshold, the memory system may adjust the granularity for tracking the quantity of executed read command for the portion. That is, the memory system may organize the portion into a set of second portions according to a second granularity and may add counters such that the memory system may track the quantity of executed read commands at each second portion. In some examples, the second granularity may be finer than the first granularity. For example, the one or more memory portions may be further divided into pages (e.g., instead of blocks).

In some examples, exceeding the baseline threshold may indicate that a portion of the memory array may benefit from read disturb remediation operations. As such, the memory system may employ read disturb remediation operations on the portion. That is, the memory system may compare the quantity of executed read commands associated with a second portion of the set of second portions to the reliability threshold. If the quantity of executed read commands exceeds the reliability threshold, the memory system may test the data and rewrite the data of the second portion to a different location (e.g., if the test indicates that the quality of the data may benefit from relocation). In some examples, as the granularity of tracking changes (e.g., increases or decreases), counters may be added, removed, or both. For example, counters associated with the one or more portions may be removed and counters associated with the second portions may be added. If a read command is executed at a location in the memory array, the memory system may locate the counter associated with the location and increment the counter. In some examples, the counter may be stored at the memory system according to a specific data organization structure (e.g., a binary tree). Using the techniques as described herein, a memory system may dynamically adjust the granularity of read disturb remediation tracking to support relatively granular tracking at relatively high usage portions of a memory array (e.g., with quantities of executed read commands exceeding a first threshold) and provide memory and processing savings by performing relatively low granularity tracking at relatively low usage portions of the memory array (e.g., with quantities of executed read commands failing to meet a second threshold). Accordingly, the memory system may efficiently identity which areas of the memory array are experiencing the most read traffic and may accurately apply read disturb remediation operations to these areas while reducing the resources involved in tracking read commands for other areas where read traffic is below a threshold.

Figure 2:
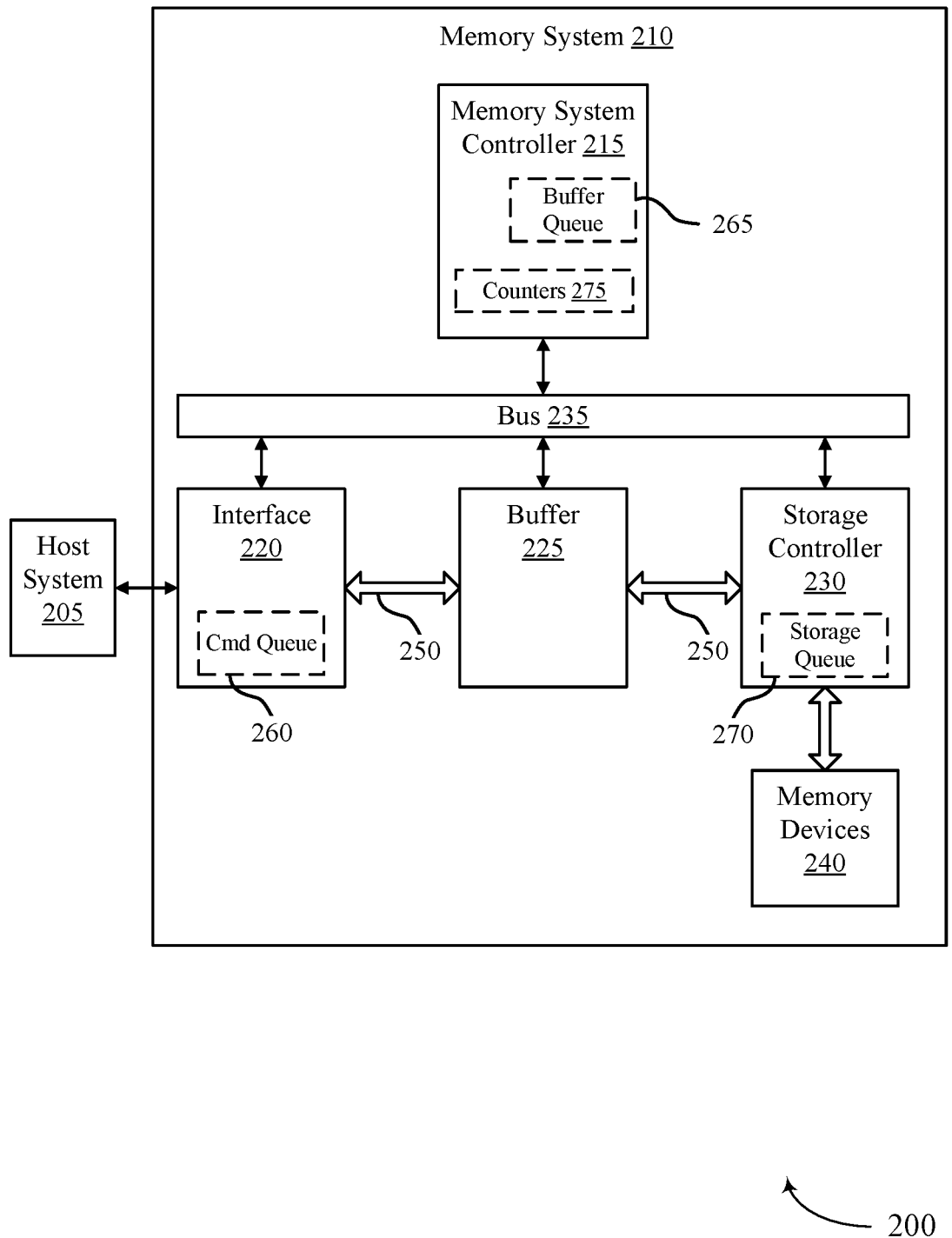
FIG. 2 illustrates an example of a system that supports techniques for adjusting a granularity associated with read disturb tracking in accordance with examples as disclosed herein.

Features of the disclosure are initially described in the context of systems and devices with reference to FIGS. 1 and 2. Features of the disclosure are described in the context of a counter storing scheme and a process flow with reference to FIGS. 3 and 4. These and other features of the disclosure are further illustrated by and described in the context of an apparatus diagram and flowchart that relate to techniques for adjusting a granularity associated with read disturb tracking with reference to FIGS. 5 and 6.

FIG. 1 illustrates an example of a system 100 that supports techniques for adjusting a granularity associated with read disturb tracking in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for adjusting a granularity associated with read disturb tracking. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

In some examples, the memory system 110 may perform a read operation to determine one or more logic states stored at one or more memory cells of a memory array included in a memory device 130. In some examples, performing multiple read operations at the same location may unintentionally alter the data stored at the location. To mitigate data degradation, the memory system 110 may employ read disturb remediation operations on the memory array. To perform read disturb remediation operations, the memory system 110 may track how many times a portion of the memory array is accessed. That is, the memory system 110 may organize the memory array of the memory device 130 into different portions and may store a counter for each portion that indicates a quantity of read commands executed on that portion. If the quantity of executed read commands corresponding to a portion exceeds a reliability threshold, the memory device 130 may rewrite the data stored at the portion to a different location (e.g., to remove unintended voltage modifications caused by the executed read commands from the written data).

Some memory systems may apply read disturb remediation operations to portions corresponding to a threshold data size (e.g., the minimum threshold size for reading data) of the memory array of a memory device. That is, the memory system may maintain a read counter for each physical location (e.g., each unit of the minimum threshold size for reading data) of the memory array. Accordingly, each portion for read disturb remediation tracking may correspond to 4 kilobytes (kBs) of storage at the memory array, and the memory system may use 4 bytes of storage to maintain a counter for each 4 kB of storage. Accordingly, such counters associated with these portions may take up valuable space in memory (e.g., up to $\frac{1}{1024}$th of the capacity of the storage device). Additionally, some portions of the memory array may rarely or never reach the reliability threshold, such that one or more of the counters may use the memory resources without adding value by triggering read disturb remediation operations.

In contrast, as described herein, a memory system 110 may adjust a granularity of read tracking for the memory array. By dynamically adjusting the granularity, the memory system 110 may support read disturb remediation while reducing memory and processing overhead associated with tracking executed read commands. In some examples, the memory system 110 may organize the memory array into portions according to a first granularity. For example, the memory system 110 may divide the memory array into different blocks 170. For each portion, the memory system 110 may track the quantity of executed read commands using counters, where each counter corresponds to a different portion. In some examples, the counters may be stored at the memory system controller 115 or at the memory device 130. The memory system 110 may periodically (or aperiodically, such as in response to a trigger) compare the quantity of executed read commands of the portions to a baseline threshold. If the quantity of executed read commands associated with a portion satisfies the baseline threshold, the memory system 110 may adjust the granularity of read tracking for the portion. For example, if the portion exceeds the baseline threshold, the memory system 110 may sub-divide the portion into multiple second portions according to a second granularity. As an example, if the one or more portions are blocks 170, the memory system 110 may adjust the read command tracking for a block from the block-level granularity to a page-level granularity, using counters to track executed read commands for pages 175 of the block 170. That is, the memory system 110 may store additional counters, where each of the additional counters corresponds to a different second portion of a second granularity.

In some examples, the memory system 110 may repeat this process and dynamically adjust the granularity of tracking (e.g., increasing granularity, decreasing granularity, or maintaining the granularity) for different portions of the memory array. The memory system 110 may periodically compare the quantity of executed read commands associated with the tracked portions (e.g., portions corresponding to any quantity of different granularities) to the baseline threshold and adjust the granularity accordingly. As another example, the memory system 110 may perform read disturb remediation operations on the tracked portions. That is, the memory system 110 may compare the quantity of executed read of commands for a portion to a reliability threshold. If the quantity of executed read of commands for one or more of the portions exceeds a reliability threshold (e.g., a same reliability threshold or a granularity-dependent reliability threshold), the memory system 110 may rewrite the data stored at the one or more portions to one or more other locations to support read disturb remediation.

FIG. 2 illustrates an example of a system 200 that supports techniques for adjusting a granularity associated with read disturb tracking in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for transferring data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received according to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may receive read commands from the host system 205. The read commands may instruct the memory system 210 to read data stored at a location of a memory array of a memory device 240. In some examples, the memory system 210 may track the quantity of read commands executed at different portions of the memory array. For example, the memory system 210 may divide the memory array into different portions according to a first granularity. Dividing the memory array according to a first granularity may involve tracking the read commands executed at different pages of the memory array. Each portion may correspond to a different counter 275 for tracking the executed read commands, and the memory system 210 may store the counters 275 at the memory system 210. For example, the memory system 210 may store the counters 275 at the memory system controller 215 (e.g., in SRAM) or at the memory device 240. If a read command associated with a portion is executed, the memory system 210 may locate the counter 275 associated with the portion and increment the counter 275.

In some examples, the memory system 210 may periodically (e.g., daily) compare the counters 275 to one or more thresholds. In some examples, the one or more thresholds may include one or both of a first threshold and a second threshold. The first threshold may be associated with a reliability threshold, where the reliability threshold may correspond to a threshold amount of times that data may be accessed before the data may experience read disturb effects. For example, the first threshold may be the reliability threshold divided by a specific periodicity. In some examples, the memory system 210 may be preconfigured with the reliability threshold. That is, the reliability threshold may be device-specific (e.g., memory device-specific). The second threshold may be less than the first threshold. As one example, the reliability threshold may be 100,000 executed read commands, and the memory array may be refreshed every 30 days. If the memory system 210 periodically checks the counters 275 daily, the first threshold may be 3,333 executed read commands per day and the second threshold may be less than 3,333 executed read commands per day. In some cases, the first threshold may trigger increasing granularity of read disturb tracking and the second threshold may trigger decreasing granularity of read disturb tracking. In some examples, once the memory system 210 compares the counters 275 to the first threshold, the second threshold, or both, the memory system 210 may subtract the first threshold value from the counters 275 (or set the counters 275 to zero if subtracting the first threshold value results in a negative value for a counter 275).

If the quantity of executed read commands associated with one or more portions exceeds the first threshold, the memory system 210 may increase the granularity of tracking for the one or more portions to a second granularity. For example, the memory system 210 may divide the one or more portions into multiple second portions according to the second granularity. As an example, if the one or more portions are blocks, then the second portions may be sets of word lines. The memory system 210 may track the quantity of executed read commands for each second portion, rather than the one or more portions. That is, the memory system 210 may store additional counters 275, where each additional counter corresponds to a second portion. In some examples, the memory system 210 may remove (or deactivate) counters 275 corresponding to the one or more portions and reallocate memory to store the counters 275 corresponding to the second portions. In some other examples, the memory system 210 may reuse the counters 275 corresponding to the one or more portions as counters for the second portions and may add one or more additional counters 275 to support the increased granularity of the second portions. In some examples, the memory system 210 may perform read disturb remediation on the second portions as described with reference to FIG. 1. Alternatively, if the quantity of executed read commands associated with one or more portions of the memory array does not exceed the first threshold, the memory system 210 may not increase the granularity of tracking for the one or more portions.

In some cases, if the quantity of executed read commands associated one or more portions does not exceed the second threshold, the memory system 210 may decrease the granularity of tracking for the one or more portions. For example, the memory system 210 may group the one or more portions into one or more third portions, where the quantity of third portions is less than the initial quantity of portions. As one example, if the memory portions are pages, the one or more third portions may be blocks. The memory system 210 may track the quantity of executed read commands for the one or more third portions instead of the one or more portions. That is, the memory system 210 may store additional counters 275 associated with the one or more third portions. In some examples, the memory system 210 may remove (or deactivate) counters corresponding to the one or more portions and reallocate memory to store the counters 275 corresponding to the one or more third portions.

In some cases, the first threshold and the second threshold may be the same threshold, such that the memory system may increase granularity if the threshold is exceeded and may decrease granularity if the threshold is not met. Alternatively, the first threshold and the second threshold may be different, where the first threshold and the second threshold may define the upper and lower bounds of a range, respectively, in which the granularity may remain unchanged.

In some examples, the memory system 210 may locate and increment counters 275 using a data organization structure (e.g., a binary tree). The root node of the binary tree may correspond to the coarsest granularity. As the granularity changes, nodes may be removed from the binary tree, added to the binary tree, or both. If a read command is executed at a location of the memory array, the memory system 210 may search the binary tree for the counter 275 that corresponds to the location of the memory array and increment the counter 275 to track the executed read command. The techniques described herein may allow a memory system 210 to locate areas of the memory array that are accessed more often than other areas of the memory array. The memory system 210 may adjust tracking granularity (e.g., using the counters 275) and perform read disturb remediation operations accordingly.

Figure 3:
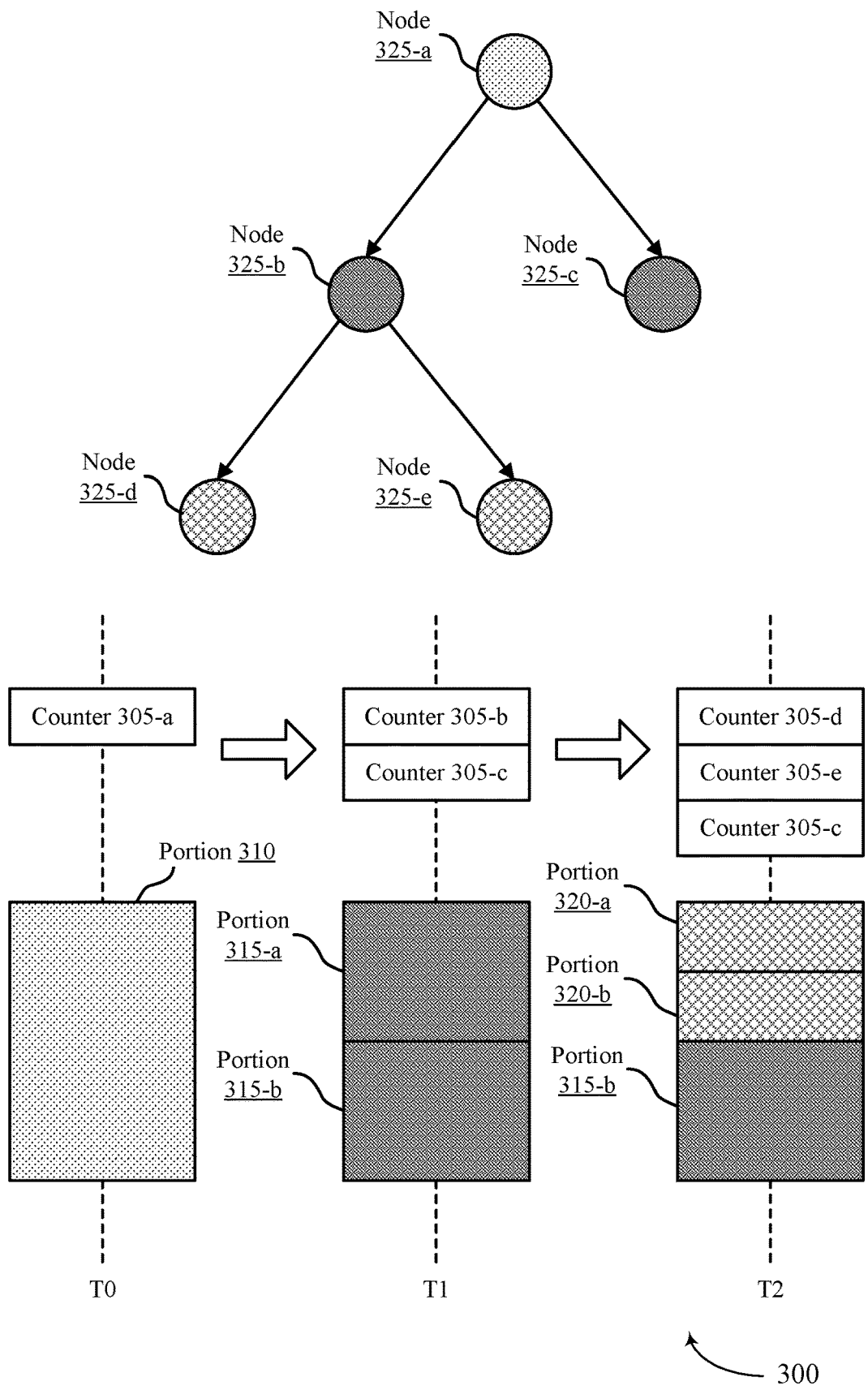
FIG. 3 illustrates an example of a counter storing scheme that supports techniques for adjusting a granularity associated with read disturb tracking in accordance with examples as disclosed herein.

FIG. 3 illustrates an example of a counter storing scheme 300 that supports techniques for adjusting a granularity associated with read disturb tracking in accordance with examples as disclosed herein. In some examples, the counter storing scheme 300 may implement aspects of the system 100 and the system 200. For example, the counter storing scheme 300 may include counters 305 which may be examples of counters 275 as described with reference to FIG. 2. Additionally, a memory system, such as a memory system 110 or a memory system 210 as described with reference to FIGS. 1 and 2, may perform the counter storing scheme 300.

As described with reference to FIG. 2, a memory system may be configured with one or more thresholds associated with read tracking. For example, the memory system may be configured with a first threshold for increasing the granularity of read tracking, a second threshold for decreasing the granularity of read tracking, or both. The first threshold may be determined using conditions such as a refresh period for the memory system, a threshold (e.g., maximum) quantity of read commands before retiring data (e.g., to mitigate read disturb occurrences), a periodicity of checking the quantity of executed read commands, or any combination thereof. For example, the first threshold may be the threshold quantity of read commands before retiring data divided by the refresh period divided by the periodicity of checking the quantity of executed read commands. In one example, the first threshold may be 3,333 executed read commands per day if the threshold quantity of executed read commands for retiring data is 100,000, the refresh period is 30 days, and the periodicity of checking the quantity of executed read commands is once per day. In some examples, the second threshold may be below the first threshold. For example, the second threshold may be determined using the first threshold and a procedure for decreasing granularity. For example, if the procedure for decreasing granularity involves combining four portion of the first granularity into a single portion at a second granularity, the second threshold may be one quarter the first threshold.

At T0, the memory system may track executed read commands for a memory array according to a first granularity. For example, the memory system may divide the memory array into a portion 310, and a counter 305-*a* corresponding to the portion 310 may be stored at the memory system (e.g., at the memory system controller). As read commands are executed at the portion 310, the memory system may increment the counter 305-*a*. In some examples, the memory system may periodically (e.g., daily) check the counter 305-*a* to determine if the counter 305-*a* satisfies one of the first threshold or the second threshold.

In some examples, the memory system may determine whether (e.g., that) the counter 305-*a* exceeds the first threshold at T1 and may increase the granularity associated with read tracking of the portion 310. For example, the memory system may divide the portion 310 according to a second granularity. That is, the memory system may divide the portion 310 into the portion 315-*a* and the portion 315-*b*. The memory system may additionally store counters 305 corresponding to the portion 315-*a* and the portion 315-*b* (e.g., a counter 305-*b* and a counter 305-*c*, respectively) to track the read commands for the portion 315-*a* and the portion 315-*b*. In some examples, the memory system may deactivate the counter 305-*a* in response to the increase in granularity and reallocate the memory used to store the counter 305-*a* for other operations. In some examples, the memory system may repeat the process as described above. That is, the memory system may periodically check the counter 305-*b* and the counter 305-*c* and determine if the counter 305-*b*, the counter 305-*b*, or both satisfy one of the first threshold or the second threshold. Alternatively, the memory system may halt adjustments in granularity (e.g., after completing an initial tuning process to set the tracking granularities) and may perform read disturb remediation operations on the portion 315-*a*, the portion 315-*b*, or both using the counter 305-*b* and the counter 305-*c*.

In some examples, the memory system may determine whether (e.g., that) the counter 305-*b* exceeds the first threshold at T2 and may increase that granularity associated with read tracking of the portion 315-*a*. For example, the memory system may divide the portion 315-*a* according to a third granularity. That is, the memory system may divide the portion 315-*a* into the portion 320-*a* and the portion 320-*b* and may store counters 305 corresponding to the portion 320-*a* and the portion 320-*b* (e.g., a counter 305-*d* and a counter 305-*e*, respectively). In some examples, the memory system may deactivate the counter 305-*b* in response to the increase in granularity and may reallocate the memory used to store the counter 305-*b* to other operations. Additionally, the memory system may determine whether (e.g., that) the counter 305-*c* does not exceed the first threshold at T2 and may maintain the granularity of tracking for the portion 315-*b*. That is, the memory system may not add or deactivate any counters associated with the portion 315-*b* at T2. Accordingly, the memory system may track executed read commands for different portions of a memory array using different granularities. By dynamically adjusting the granularities, the memory system may perform efficient tracking of read commands to support read disturb remediation. For example, the memory system may perform relatively high granularity tracking (e.g., high-resolution tracking, such as at a page level granularity, page line group level granularity, word line level granularity) in parts of a memory array that perform relatively frequent read operations to support targeted and efficient read disturb remediation and may perform relatively low granularity tracking (e.g., virtual block level granularity, block level granularity) in parts of the memory array that perform relatively infrequent read operations to support memory and processing resource savings.

In some examples, the memory system may repeat the process as described above. That is, the memory system may periodically check the counter 305-*d*, the counter 305-*e*, and the counter 305-*c* and determine if any counter 305 satisfies one of the first threshold or the second threshold. Alternatively, the memory system may halt adjustments in granularity and perform read disturb remediation operations on the portion 320-*a*, the portion 320-*b*, the portion 315-*b*, or some combination thereof using the counters 305.

The memory system may store the counters 305 hierarchically. For example, the memory system may store the counters 305 according to a tree structure or another data structure. If storing the counters 305 using a binary tree structure, the counter associated with coarsest granularity may correspond to the root node of the tree. For example, the counter 305-*a* may correspond to the node 325-*a*. If the counter 305-*a* exceeds the first threshold at T1, the memory system may flag the node 325-*a* and add a node 325-*b* and a node 325-*c* to the tree structure, where the node 325-*b* and the node 325-*c* may be child nodes of the node 325-*a*. The node 325-*b* may correspond to the counter 305-*b* and the node 325-*c* may correspond to the counter 305-*c*. If, at (or after) time T1, a read command is executed on one or more memory cells located within the portion 315-*a* of the memory array, the memory system may traverse the tree to identify the node 325-*b* corresponding to these one or more memory cells and increment the corresponding counter 305-*b*. That is, upon creation of the node 325-*b* and the node 325-*c*, the memory system may determine logic for traversing from the node 325-*a*. For example, if an executed read command indicates an address (e.g., an LBA, a physical address) within the memory array within a first set of addresses, the memory system may traverse from the node 325-*a* to the node 325-*b*, while if the address within the memory array is within a second set of addresses, the memory system may traverse from the node 325-*a* to the node 325-*c*. Once the memory system reaches a node 325 without any further branches in the binary tree, the memory system may determine to increment the counter 305 corresponding to the node 325.

For example, if the counter 305-*b* exceeds the first threshold at time T2, the memory system may flag the node 325-*b* and add a node 325-*d* and a node 325-*e* to the tree structure, where the node 325-*d* and the node 325-*e* are child nodes of the node 325-*b*. The node 325-*d* may correspond to the counter 305-*d* and the node 325-*e* may correspond to counter 305-*e*. If a read command is executed at portion 320-*a* at (or after) time T2, the memory system may traverse the tree to the node 325-*d* and increment the corresponding counter 305-*d*. That is, the memory system may recognize that the node 325-*b* has child nodes 325 and may continue down the tree to node 325-*d*. In some examples, nodes 325 may also be removed from the tree. For example, if the memory system determines that the portion 320-*a* and the portion 320-*b* do not exceed first threshold and are below the second threshold at a later time, the memory system may decrease the granularity for read tracking and combine the portion 320-*a* and the portion 320-*b* into a common portion for tracking (e.g., a portion 315-*a*). In such an example, one or more nodes 325 (e.g., the node 325-*d* and the node 325-*e*) may be removed from the binary tree to reflect the decrease in granularity and allow the memory system to accurately determine which counter 305 to increment for an executed read command.

Figure 4:
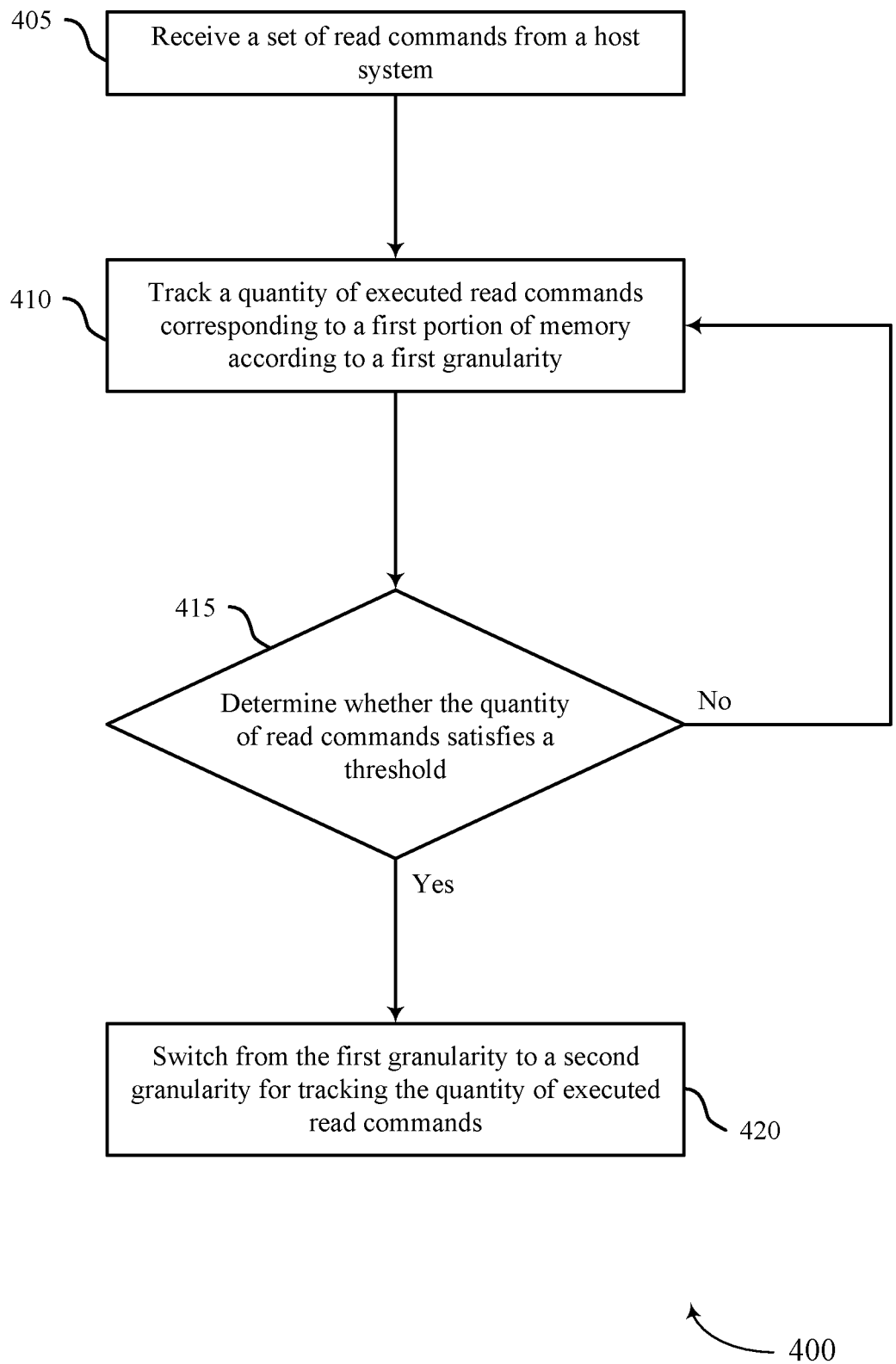
FIG. 4 illustrates an example of a process flow that supports techniques for adjusting a granularity associated with read disturb tracking in accordance with examples as disclosed herein.

FIG. 4 illustrates an example of a process flow 400 that supports techniques for adjusting a granularity associated with read disturb tracking in accordance with examples as disclosed herein. The process flow 400 may be performed by a memory system (or one or more components thereof), such as the memory system 110 or the memory system 210 as described with reference to FIGS. 1 and 2. In some cases, alternative examples of the following may be implemented, where some operations may be performed in a different order than described or are not performed at all. Additionally or alternatively, operations may include additional features not mentioned below, or further processes may be added.

At 405, a set of read commands are received from a host system. A read command may be an example of an access command and may indicate for the memory system to read data stored at a memory device.

At 410, a quantity of executed read commands corresponding to a first portion of a memory array is tracked according to a first granularity. The first granularity may be an example of a memory array-level granularity, a virtual block-level granularity, a block-level granularity, a page-level granularity, a page line group-level granularity, a word line-level granularity, or any other supported granularity. If a read command is executed at the first portion of the memory array, the memory system may increment a counter associated with the first portion. To locate the counter associated with the first portion, the memory system may search data (e.g., data stored according to a tree structure). In some examples, one or both of the counter or the data may be stored at a memory system controller of the memory system.

At 415, it may be determined (e.g., by the memory system) whether the quantity of read commands corresponding to the first portion of the memory array satisfies a threshold during a first duration. Satisfying the threshold may involve the quantity of read commands corresponding to the first portion being below or above the threshold. In some examples, the memory system may maintain a real-time clock (RTC) and may determine whether the quantity of read commands corresponding to the first portion satisfies the threshold after identifying that the first duration (e.g., 24 hours) has passed using the RTC. If the quantity of read commands corresponding to the first portion satisfies the threshold, the memory system may adjust the granularity for tracking read commands at 420. If the quantity of read commands corresponding to the first portion does not satisfy the threshold, the memory system may continue tracking executed read commands for the first portion using the first granularity (e.g., at 410).

At 420, the first granularity is switched to a second granularity for tracking the quantity of executed read commands. If satisfying the threshold involves the quantity of executed read commands for the first portion exceeding the threshold, the memory system may increase the granularity for tracking. That is, the memory system may track a set of second quantities of executed read commands corresponding to respective sub-portions of the first portion of the memory array according to the second granularity. In another example, if satisfying the threshold corresponds to the quantity of executed read commands corresponding to the first portion being below the threshold, the memory system may decrease the granularity for tracking. As the granularity for tracking changes, the data for storing the counters may change. For example, if the granularity for tracking is increased, one or more additional nodes may be added to the data and if the granularity decreases, one or more nodes may be removed. As one example, one or more additional nodes corresponding to the sub-portions of the first portion of the memory array may be added if the granularity increases. In some examples, the second granularity may be an example of a memory array-level granularity, a virtual block-level granularity, a block-level granularity, a page-level granularity, a page line group-level granularity, a word line-level granularity, or any other supported granularity (e.g., different from the first granularity).

The process flow 400 may support a memory system maintaining relatively high-resolution read counts for areas of a memory array which are accessed relatively frequently and, correspondingly, are at risk for read disturb reliability issues. However, the memory system may maintain relatively low-resolution read counts for other areas of the memory array which are accessed relatively infrequently to improve memory usage while still tracking information associated with read disturb mitigation (e.g., what data is being accessed most frequently, how frequently is the data accessed, where is this data stored, should the data be accessed for migration or remediation, or some combination of this information).

Aspects of the process flow 400 may be implemented by a controller in a system (such as a memory system), among other components. For example, a memory system controller of a memory system may perform one or more aspects of the process flow 400. Additionally or alternatively, aspects of the process flow 400 may be implemented as instructions stored in memory (e.g., firmware stored in a memory coupled with a memory system). For example, the instructions, if executed by a controller (e.g., a memory system controller), may cause the controller to perform the operations of the process flow 400.

Figure 5:
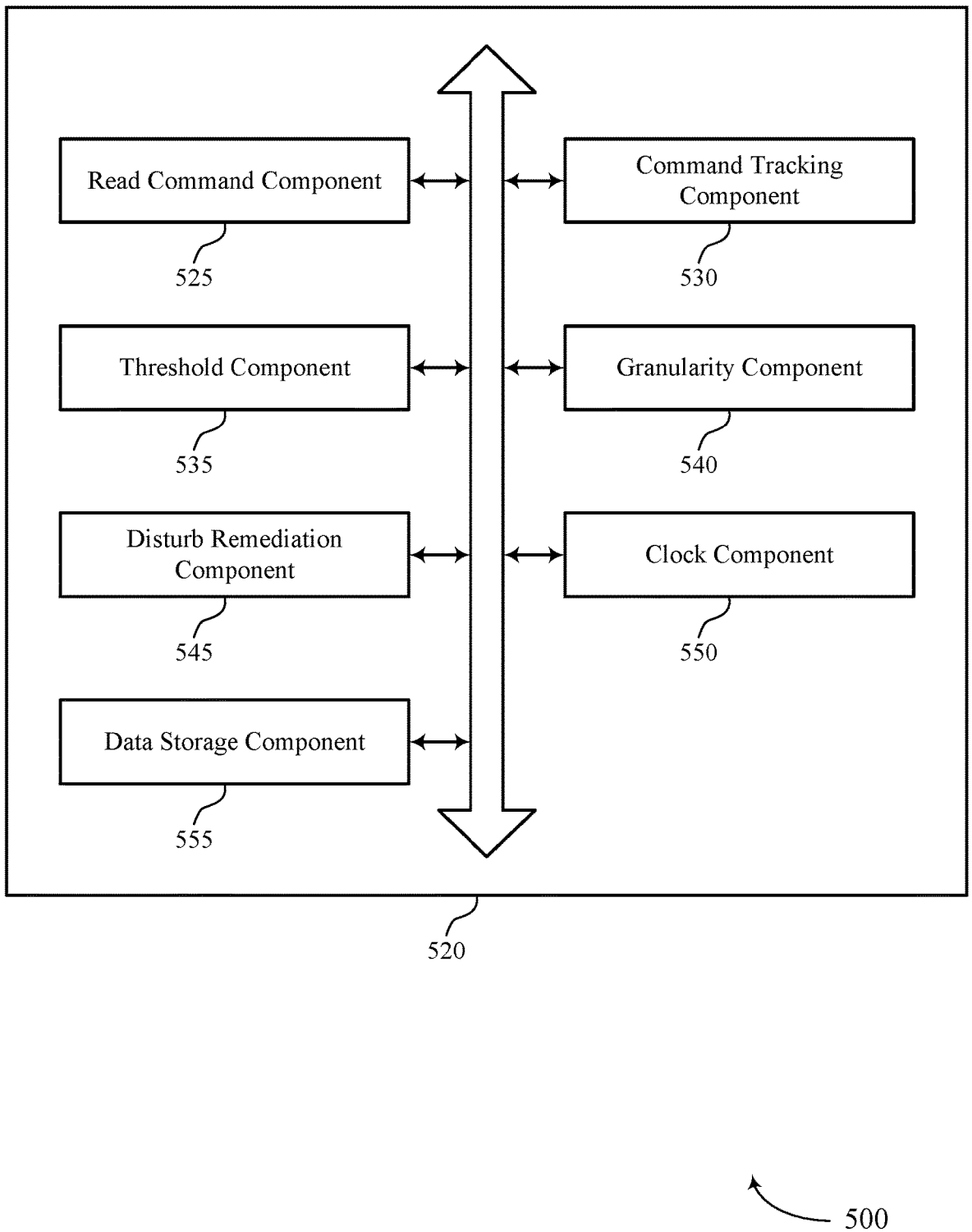
FIG. 5 shows a block diagram of a memory system that supports techniques for adjusting a granularity associated with read disturb tracking in accordance with examples as disclosed herein.

FIG. 5 shows a block diagram 500 of a memory system 520 that supports techniques for adjusting a granularity associated with read disturb tracking in accordance with examples as disclosed herein. The memory system 520 may be an example of aspects of a memory system as described with reference to FIGS. 1 through 4. The memory system 520, or various components thereof, may be an example of means for performing various aspects of adjusting a granularity associated with read disturb tracking as described herein. For example, the memory system 520 may include a read command component 525, a command tracking component 530, a threshold component 535, a granularity component 540, a disturb remediation component 545, a clock component 550, a data storage component 555, or any combination thereof. Each of these components may communicate, directly or indirectly, with one another (e.g., via one or more buses). In some examples, the memory system 520 may be an example of an apparatus including a memory device and a controller coupled with the memory device and configured to cause the apparatus to perform one or more operations described herein. In some cases, the memory device may include a memory array, and the memory array may include one or more memory cells for storing data.

The read command component 525 may be configured as or otherwise support a means for receiving a plurality of read commands for accessing one or more memory cells of a memory array (e.g., of the memory device). The command tracking component 530 may be configured as or otherwise support a means for tracking a quantity of executed read commands corresponding to a first portion of the memory array according to a first granularity, the tracking based at least in part on (e.g., in response to) executing the quantity of the plurality of read commands. The threshold component 535 may be configured as or otherwise support a means for determining whether the quantity of executed read commands corresponding to the first portion of the memory array satisfies a threshold value during a first duration. The granularity component 540 may be configured as or otherwise support a means for switching from the first granularity to a second granularity for tracking the quantity of executed read commands corresponding to the first portion of the memory array based at least in part on (e.g., in response to) determining that the quantity of executed read commands corresponding to the first portion of the memory array satisfies the threshold value during the first duration.

In some examples, the quantity of executed read commands corresponding to the first portion of the memory array satisfies the threshold value during the first duration based at least in part on (e.g., as a result of) the quantity of executed read commands exceeding a first threshold. In some such examples, to support switching from the first granularity to the second granularity, the granularity component 540 may be configured as or otherwise support a means for increasing a granularity for tracking the quantity of executed read commands corresponding to the first portion of the memory array.

In some examples, the quantity of executed read commands corresponding to the first portion of the memory array satisfies the threshold value during the first duration based at least in part on (e.g., as a result of) the quantity of executed read commands being less than a second threshold. In some such examples, to support switching from the first granularity to the second granularity, the granularity component 540 may be configured as or otherwise support a means for decreasing a granularity for tracking the quantity of executed read commands corresponding to the first portion of the memory array.

In some examples, to support tracking the quantity of executed read commands corresponding to the first portion of the memory array according to the first granularity, the command tracking component 530 may be configured as or otherwise support a means for searching data for a counter corresponding to the first portion of the memory array based at least in part on (e.g., in response to) executing a read command of the plurality of read commands for accessing a memory cell corresponding to the first portion of the memory array. In some examples, to support tracking the quantity of executed read commands corresponding to the first portion of the memory array according to the first granularity, the command tracking component 530 may be configured as or otherwise support a means for incrementing the counter based at least in part on (e.g., in response to) executing the read command.

In some examples, the command tracking component 530 may be configured as or otherwise support a means for updating the data based at least in part on (e.g., in response to) switching from the first granularity to the second granularity for tracking the quantity of executed read commands corresponding to the first portion of the memory array.

In some examples, to support updating the data, the command tracking component 530 may be configured as or otherwise support a means for adding one or more additional nodes to the data based at least in part on (e.g., in response to) switching from the first granularity to the second granularity and the second granularity being greater than the first granularity. In some examples, to support updating the data, the command tracking component 530 may be configured as or otherwise support a means for removing one or more nodes from the data based at least in part on (e.g., in response to) switching from the first granularity to the second granularity and the first granularity being greater than the second granularity.

In some examples, the data storage component 555 may be configured as or otherwise support a means for storing the data, the counter, or both at a memory system controller of the memory system.

In some examples, the command tracking component 530 may be configured as or otherwise support a means for tracking a plurality of second quantities of executed read commands corresponding to respective sub-portions of the first portion of the memory array according to the second granularity based at least in part on (e.g., due to) switching from the first granularity to the second granularity and the second granularity being greater than the first granularity.

In some examples, the command tracking component 530 may be configured as or otherwise support a means for activating a plurality of second counters indicating respective second quantities of the plurality of second quantities of executed read commands based at least in part on (e.g., in response to) switching from the first granularity to the second granularity and the second granularity being greater than the first granularity.

In some examples, the threshold component 535 may be configured as or otherwise support a means for determining whether a second quantity of the plurality of second quantities of executed read commands corresponding to a respective sub-portion of the first portion of the memory array satisfies a second threshold value during a second duration. In some examples, the granularity component 540 may be configured as or otherwise support a means for switching from the second granularity to a third granularity for tracking the second quantity of the plurality of second quantities of executed read commands corresponding to the respective sub-portion of the first portion of the memory array based at least in part on (e.g., in response to) determining that the second quantity of the plurality of second quantities of executed read commands corresponding to the respective sub-portion of the first portion of the memory array satisfies the second threshold value during the second duration.

In some examples, the threshold component 535 may be configured as or otherwise support a means for determining whether a second quantity of the plurality of second quantities of executed read commands corresponding to a respective sub-portion of the first portion of the memory array satisfies a second threshold value during a second duration. In some examples, the granularity component 540 may be configured as or otherwise support a means for refraining from switching from the second granularity for tracking the second quantity of the plurality of second quantities of executed read commands corresponding to the respective sub-portion of the first portion of the memory array based at least in part on (e.g., in response to) determining that the second quantity of the plurality of second quantities of executed read commands corresponding to the respective sub-portion of the first portion of the memory array fails to satisfy the second threshold value during the second duration.

In some examples, the command tracking component 530 may be configured as or otherwise support a means for resetting a second counter indicating the second quantity of the plurality of second quantities of executed read commands based at least in part on (e.g., after) determining that the second quantity of the plurality of second quantities of executed read commands corresponding to the respective sub-portion of the first portion of the memory array fails to satisfy the second threshold value during the second duration.

In some examples, the command tracking component 530 may be configured as or otherwise support a means for deactivating a counter indicating the quantity of executed read commands based at least in part on (e.g., in response to) switching from the first granularity to the second granularity and the first granularity being greater than the second granularity.

In some examples, the disturb remediation component 545 may be configured as or otherwise support a means for performing read disturb remediation on the first portion of the memory array based at least in part on (e.g., in response to) determining that the quantity of executed read commands corresponding to the first portion of the memory array satisfies the threshold value during the first duration.

In some examples, the clock component 550 may be configured as or otherwise support a means for maintaining an RTC. In some examples, the clock component 550 may be configured as or otherwise support a means for identifying that the first duration has passed using the RTC, where determining whether the quantity of executed read commands corresponding to the first portion of the memory array satisfies the threshold value during the first duration is triggered based at least in part on (e.g., in response to) identifying that the first duration has passed.

In some examples, the first granularity includes memory array level granularity, virtual block level granularity, block level granularity, page level granularity, page line group level granularity, or word line level granularity and the second granularity is different from the first granularity and includes memory array level granularity, virtual block level granularity, block level granularity, page level granularity, page line group level granularity, or word line level granularity.

In some examples, the threshold value, the first duration, or both are based at least in part on (e.g., determined using) a refresh period for the memory array, a read threshold for retiring data of the memory array, or both.

Figure 6:
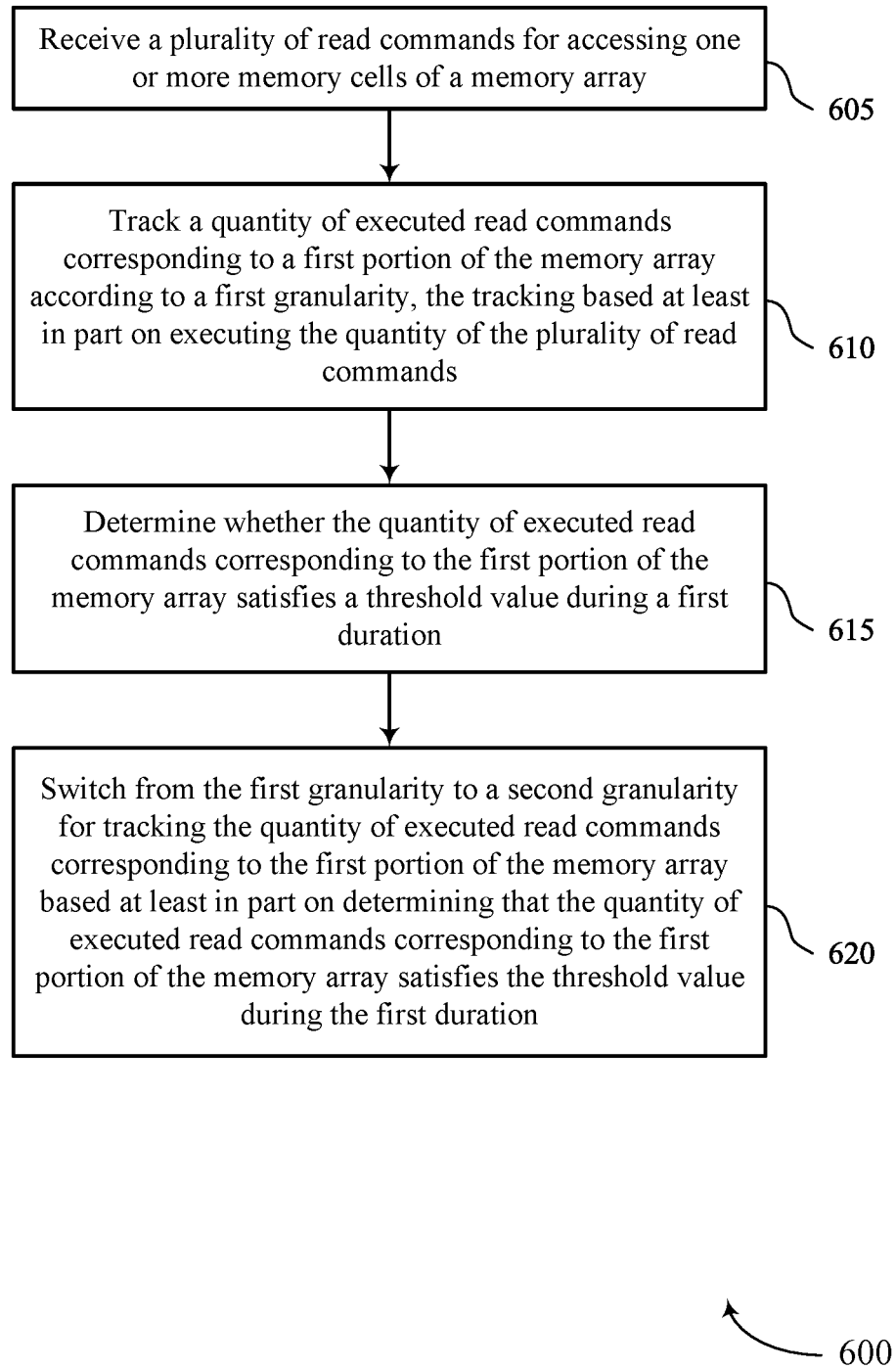
FIG. 6 shows a flowchart illustrating a method or methods that support techniques for adjusting a granularity associated with read disturb tracking in accordance with examples as disclosed herein.

FIG. 6 shows a flowchart illustrating a method 600 that supports techniques for adjusting a granularity associated with read disturb tracking in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a plurality of read commands for accessing one or more memory cells of a memory array. The operations of 605 may be performed in accordance with examples as disclosed herein. In some examples, aspects of the operations of 605 may be performed by a read command component 525 as described with reference to FIG. 5.

At 610, the method may include tracking a quantity of executed read commands corresponding to a first portion of the memory array according to a first granularity, the tracking based at least in part on (e.g., in response to) executing the quantity of the plurality of read commands. The operations of 610 may be performed in accordance with examples as disclosed herein. In some examples, aspects of the operations of 610 may be performed by a command tracking component 530 as described with reference to FIG. 5.

At 615, the method may include determining whether the quantity of executed read commands corresponding to the first portion of the memory array satisfies a threshold value during a first duration. The operations of 615 may be performed in accordance with examples as disclosed herein. In some examples, aspects of the operations of 615 may be performed by a threshold component 535 as described with reference to FIG. 5.

At 620, the method may include switching from the first granularity to a second granularity for tracking the quantity of executed read commands corresponding to the first portion of the memory array based at least in part on (e.g., in response to) determining that the quantity of executed read commands corresponding to the first portion of the memory array satisfies the threshold value during the first duration. The operations of 620 may be performed in accordance with examples as disclosed herein. In some examples, aspects of the operations of 620 may be performed by a granularity component 540 as described with reference to FIG. 5.

In some examples, an apparatus as described herein may perform a method or methods, such as the method 600. The apparatus may include features, circuitry, logic, means, a controller (e.g., a controller coupled with a memory device), or instructions (e.g., a non-transitory computer-readable medium storing code including instructions which, if executed by a processor of an electronic device, may cause the electronic device to perform operations) for receiving a plurality of read commands for accessing one or more memory cells of a memory array, tracking a quantity of executed read commands corresponding to a first portion of the memory array according to a first granularity, the tracking based at least in part on (e.g., in response to) executing the quantity of the plurality of read commands, determining whether the quantity of executed read commands corresponding to the first portion of the memory array satisfies a threshold value during a first duration, and switching from the first granularity to a second granularity for tracking the quantity of executed read commands corresponding to the first portion of the memory array based at least in part on (e.g., in response to) determining that the quantity of executed read commands corresponding to the first portion of the memory array satisfies the threshold value during the first duration.

In some examples of the method 600 and the apparatus described herein, the quantity of executed read commands corresponding to the first portion of the memory array satisfies the threshold value during the first duration based at least in part on (e.g., as a result of) the quantity of executed read commands exceeding a first threshold, and switching from the first granularity to the second granularity may include operations, features, circuitry, logic, means, or instructions for increasing a granularity for tracking the quantity of executed read commands corresponding to the first portion of the memory array.

In some examples of the method 600 and the apparatus described herein, the quantity of executed read commands corresponding to the first portion of the memory array satisfies the threshold value during the first duration based at least in part on (e.g., as a result of) the quantity of executed read commands being less than a second threshold, and switching from the first granularity to the second granularity may include operations, features, circuitry, logic, means, or instructions for decreasing a granularity for tracking the quantity of executed read commands corresponding to the first portion of the memory array.

In some examples of the method 600 and the apparatus described herein, tracking the quantity of executed read commands corresponding to the first portion of the memory array according to the first granularity may include operations, features, circuitry, logic, means, or instructions for searching data for a counter corresponding to the first portion of the memory array based at least in part on (e.g., in response to) executing a read command of the plurality of read commands for accessing a memory cell corresponding to the first portion of the memory array and incrementing the counter based at least in part on (e.g., in response to) executing the read command.

Some examples of the method 600 and the apparatus described herein may further include operations, features, circuitry, logic, means, or instructions for updating the data based at least in part on (e.g., in response to) switching from the first granularity to the second granularity for tracking the quantity of executed read commands corresponding to the first portion of the memory array.

In some examples of the method 600 and the apparatus described herein, updating the data may include operations, features, circuitry, logic, means, or instructions for adding one or more additional nodes to the data based at least in part on (e.g., in response to) switching from the first granularity to the second granularity and the second granularity being greater than the first granularity or removing one or more nodes from the data based at least in part on (e.g., in response to) switching from the first granularity to the second granularity and the first granularity being greater than the second granularity.

Some examples of the method 600 and the apparatus described herein may further include operations, features, circuitry, logic, means, or instructions for storing the data, the counter, or both at a memory system controller of the memory system.

Some examples of the method 600 and the apparatus described herein may further include operations, features, circuitry, logic, means, or instructions for tracking a plurality of second quantities of executed read commands corresponding to respective sub-portions of the first portion of the memory array according to the second granularity based at least in part on (e.g., in response to) switching from the first granularity to the second granularity and the second granularity being greater than the first granularity.

Some examples of the method 600 and the apparatus described herein may further include operations, features, circuitry, logic, means, or instructions for activating a plurality of second counters indicating respective second quantities of the plurality of second quantities of executed read commands based at least in part on (e.g., in response to) switching from the first granularity to the second granularity and the second granularity being greater than the first granularity.

Some examples of the method 600 and the apparatus described herein may further include operations, features, circuitry, logic, means, or instructions for determining whether a second quantity of the plurality of second quantities of executed read commands corresponding to a respective sub-portion of the first portion of the memory array satisfies a second threshold value during a second duration and switching from the second granularity to a third granularity for tracking the second quantity of the plurality of second quantities of executed read commands corresponding to the respective sub-portion of the first portion of the memory array based at least in part on (e.g., in response to) determining that the second quantity of the plurality of second quantities of executed read commands corresponding to the respective sub-portion of the first portion of the memory array satisfies the second threshold value during the second duration.

Some examples of the method 600 and the apparatus described herein may further include operations, features, circuitry, logic, means, or instructions for determining whether a second quantity of the plurality of second quantities of executed read commands corresponding to a respective sub-portion of the first portion of the memory array satisfies a second threshold value during a second duration and refraining from switching from the second granularity for tracking the second quantity of the plurality of second quantities of executed read commands corresponding to the respective sub-portion of the first portion of the memory array based at least in part on (e.g., in response to) determining that the second quantity of the plurality of second quantities of executed read commands corresponding to the respective sub-portion of the first portion of the memory array fails to satisfy the second threshold value during the second duration.

Some examples of the method 600 and the apparatus described herein may further include operations, features, circuitry, logic, means, or instructions for resetting a second counter indicating the second quantity of the plurality of second quantities of executed read commands based at least in part on (e.g., after) determining that the second quantity of the plurality of second quantities of executed read commands corresponding to the respective sub-portion of the first portion of the memory array fails to satisfy the second threshold value during the second duration.

Some examples of the method 600 and the apparatus described herein may further include operations, features, circuitry, logic, means, or instructions for deactivating a counter indicating the quantity of executed read commands based at least in part on (e.g., in response to) switching from the first granularity to the second granularity and the first granularity being greater than the second granularity.

Some examples of the method 600 and the apparatus described herein may further include operations, features, circuitry, logic, means, or instructions for performing read disturb remediation on the first portion of the memory array based at least in part on (e.g., in response to) determining that the quantity of executed read commands corresponding to the first portion of the memory array satisfies the threshold value during the first duration.

Some examples of the method 600 and the apparatus described herein may further include operations, features, circuitry, logic, means, or instructions for maintaining an RTC and identifying that the first duration has passed using the RTC, where determining whether the quantity of executed read commands corresponding to the first portion of the memory array satisfies the threshold value during the first duration may be triggered based at least in part on (e.g., in response to) identifying that the first duration may have passed.

In some examples of the method 600 and the apparatus described herein, the first granularity includes memory array level granularity, virtual block level granularity, block level granularity, page level granularity, page line group level granularity, or word line level granularity and the second granularity may be different from the first granularity and includes memory array level granularity, virtual block level granularity, block level granularity, page level granularity, page line group level granularity, or word line level granularity.

In some examples of the method 600 and the apparatus described herein, the threshold value, the first duration, or both may be based at least in part on (e.g., determined using) a refresh period for the memory array, a read threshold for retiring data of the memory array, or both.

Aspects of the method 600 may be implemented by a controller, among other components. Additionally or alternatively, aspects of the method 600 may be implemented as instructions stored in memory (e.g., firmware stored in a memory coupled with a memory device including one or more memory cells of a memory array). For example, the instructions, if executed by a controller (e.g., a memory system controller), may cause the controller to perform the operations of the method 600.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive material, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. An apparatus, comprising:
a memory device; and a controller coupled with the memory device and configured to cause the apparatus to:
   receive a plurality of read commands for accessing one or more memory cells of a memory array;
   increment, for each read command of the plurality of read commands executed to access one or more memory cells of a first portion of the memory array, a counter that tracks a quantity of executed read commands corresponding to the first portion of the memory array according to a first granularity;
   determine whether the quantity of executed read commands corresponding to the first portion of the memory array satisfies a threshold value during a first duration; and
   switch from the first granularity to a second granularity for tracking the quantity of executed read commands corresponding to the first portion of the memory array based at least in part on determining that the quantity of executed read commands corresponding to the first portion of the memory array satisfies the threshold value during the first duration.

2. The apparatus of claim 1, wherein the quantity of executed read commands corresponding to the first portion of the memory array satisfies the threshold value during the first duration based at least in part on the quantity of executed read commands exceeding a first threshold, and wherein the controller configured to cause the apparatus to switch from the first granularity to the second granularity is configured to cause the apparatus to:
   increase a granularity for tracking the quantity of executed read commands corresponding to the first portion of the memory array.

3. The apparatus of claim 1, wherein the quantity of executed read commands corresponding to the first portion of the memory array satisfies the threshold value during the first duration based at least in part on the quantity of executed read commands being less than a second threshold, and wherein the controller configured to cause the apparatus to switch from the first granularity to the second granularity is configured to cause the apparatus to:
   decrease a granularity for tracking the quantity of executed read commands corresponding to the first portion of the memory array.

4. The apparatus of claim 1, wherein the controller configured to cause the apparatus to track the quantity of executed read commands corresponding to the first portion of the memory array according to the first granularity is configured to cause the apparatus to:
   search data for the counter corresponding to the first portion of the memory array based at least in part on executing a read command of the plurality of read commands for accessing a memory cell corresponding to the first portion of the memory array, wherein incrementing the counter is based at least in part on executing the read command.

5. The apparatus of claim 4, wherein the controller is further configured to cause the apparatus to:
   update the data based at least in part on switching from the first granularity to the second granularity for tracking the quantity of executed read commands corresponding to the first portion of the memory array.

6. The apparatus of claim 5, wherein the controller configured to cause the apparatus to update the data is configured to cause the apparatus to:
   add one or more additional nodes to the data based at least in part on switching from the first granularity to the second granularity and the second granularity being greater than the first granularity; or
   remove one or more nodes from the data based at least in part on switching from the first granularity to the second granularity and the first granularity being greater than the second granularity.

7. The apparatus of claim 4, wherein the controller is further configured to cause the apparatus to:
   store the data, the counter, or both at a memory system controller of a memory system.

8. The apparatus of claim 1, wherein the controller is further configured to cause the apparatus to:
   track a plurality of second quantities of executed read commands corresponding to respective sub-portions of the first portion of the memory array according to the second granularity based at least in part on switching from the first granularity to the second granularity and the second granularity being greater than the first granularity.

9. The apparatus of claim 8, wherein the controller is further configured to cause the apparatus to:
   activate a plurality of second counters indicating respective second quantities of the plurality of second quantities of executed read commands based at least in part on switching from the first granularity to the second granularity and the second granularity being greater than the first granularity.

10. The apparatus of claim 1, wherein the controller is further configured to cause the apparatus to:
   deactivate the counter indicating the quantity of executed read commands based at least in part on switching from the first granularity to the second granularity and the first granularity being greater than the second granularity.

11. The apparatus of claim 1, wherein the controller is further configured to cause the apparatus to:
   perform read disturb remediation on the first portion of the memory array based at least in part on determining that the quantity of executed read commands corresponding to the first portion of the memory array satisfies the threshold value during the first duration.

12. The apparatus of claim 1, wherein the controller is further configured to cause the apparatus to:
   maintain a real time clock; and
   identify that the first duration has passed using the real time clock, wherein the controller configured to cause the apparatus to determine whether the quantity of executed read commands corresponding to the first portion of the memory array satisfies the threshold value during the first duration is configured to cause the apparatus to trigger determine whether the quantity of executed read commands corresponding to the first portion of the memory array satisfies the threshold value during the first duration based at least in part on identifying that the first duration has passed.

13. The apparatus of claim 1, wherein the first granularity comprises memory array level granularity, virtual block level granularity, block level granularity, page level granularity, page line group level granularity, or word line level granularity and the second granularity is different from the first granularity and comprises memory array level granularity, virtual block level granularity, block level granularity, page level granularity, page line group level granularity, or word line level granularity.

14. The apparatus of claim 1, wherein the threshold value, the first duration, or both are based at least in part on a refresh period for the memory array, a read threshold for retiring data of the memory array, or both.

15. A non-transitory computer-readable medium storing code comprising instructions which, when executed by a processor of an electronic device, cause the electronic device to:
   receive a plurality of read commands for accessing one or more memory cells of a memory array;
   increment, for each read command of the plurality of read commands executed to access one or more memory cells of a first portion of the memory array, a counter that tracks a quantity of executed read commands corresponding to the first portion of the memory array according to a first granularity;
   determine whether the quantity of executed read commands corresponding to the first portion of the memory array satisfies a threshold value during a first duration; and
   switch from the first granularity to a second granularity for tracking the quantity of executed read commands corresponding to the first portion of the memory array based at least in part on determining that the quantity of executed read commands corresponding to the first portion of the memory array satisfies the threshold value during the first duration.

16. The non-transitory computer-readable medium of claim 15, wherein the quantity of executed read commands corresponding to the first portion of the memory array satisfies the threshold value during the first duration based at least in part on the quantity of executed read commands exceeding a first threshold, and wherein the instructions that cause the electronic device to switch from the first granularity to the second granularity, when executed by the processor of the electronic device, cause the electronic device to:
   increase a granularity for tracking the quantity of executed read commands corresponding to the first portion of the memory array.

17. A method performed by a memory system, comprising:
   receiving a plurality of read commands for accessing one or more memory cells of a memory array;
   incrementing, for each read command of the plurality of read commands executed to access one or more memory cells of a first portion of the memory array, a counter that tracks a quantity of executed read commands corresponding to the first portion of the memory array according to a first granularity;
   determining whether the quantity of executed read commands corresponding to the first portion of the memory array satisfies a threshold value during a first duration; and
   switching from the first granularity to a second granularity for tracking the quantity of executed read commands corresponding to the first portion of the memory array based at least in part on determining that the quantity of executed read commands corresponding to the first portion of the memory array satisfies the threshold value during the first duration.

18. An apparatus, comprising:
   a memory device; and
   a controller coupled with the memory device and configured to cause the apparatus to:
      receive a plurality of read commands for accessing one or more memory cells of a memory array;
      track a quantity of executed read commands corresponding to a first portion of the memory array according to a first granularity, the tracking based at least in part on executing the quantity of the plurality of read commands;
      determine whether the quantity of executed read commands corresponding to the first portion of the memory array satisfies a threshold value during a first duration;
      switch from the first granularity to a second granularity for tracking the quantity of executed read commands corresponding to the first portion of the memory array based at least in part on determining that the quantity of executed read commands corresponding to the first portion of the memory array satisfies the threshold value during the first duration;
      track a plurality of second quantities of executed read commands corresponding to respective sub-portions of the first portion of the memory array according to the second granularity based at least in part on switching from the first granularity to the second granularity and the second granularity being greater than the first granularity;
      determine whether a second quantity of the plurality of second quantities of executed read commands corresponding to a respective sub-portion of the first portion of the memory array satisfies a second threshold value during a second duration; and
      switch from the second granularity to a third granularity for tracking the second quantity of the plurality of second quantities of executed read commands corresponding to the respective sub-portion of the first portion of the memory array based at least in part on determining that the second quantity of the plurality of second quantities of executed read commands corresponding to the respective sub-portion of the first portion of the memory array satisfies the second threshold value during the second duration.

19. An apparatus, comprising:
   a memory device; and
   a controller coupled with the memory device and configured to cause the apparatus to:
      receive a plurality of read commands for accessing one or more memory cells of a memory array;
      track a quantity of executed read commands corresponding to a first portion of the memory array according to a first granularity, the tracking based at least in part on executing the quantity of the plurality of read commands;
      determine whether the quantity of executed read commands corresponding to the first portion of the memory array satisfies a threshold value during a first duration;
      switch from the first granularity to a second granularity for tracking the quantity of executed read commands corresponding to the first portion of the memory array based at least in part on determining that the quantity of executed read commands corresponding to the first portion of the memory array satisfies the threshold value during the first duration;
      track a plurality of second quantities of executed read commands corresponding to respective sub-portions of the first portion of the memory array according to the second granularity based at least in part on switching from the first granularity to the second granularity and the second granularity being greater than the first granularity;
      determine whether a second quantity of the plurality of second quantities of executed read commands corresponding to a respective sub-portion of the first portion of the memory array satisfies a second threshold value during a second duration; and refrain from switching from the second granularity for tracking the second quantity of the plurality of second quantities of executed read commands corresponding to the respective sub-portion of the first portion of the memory array based at least in part on determining that the second quantity of the plurality of second quantities of executed read commands corresponding to the respective sub-portion of the first portion of the memory array fails to satisfy the second threshold value during the second duration.

20. The apparatus of claim 19, wherein the controller is further configured to cause the apparatus to:

reset a second counter indicating the second quantity of the plurality of second quantities of executed read commands based at least in part on determining that the second quantity of the plurality of second quantities of executed read commands corresponding to the respective sub-portion of the first portion of the memory array fails to satisfy the second threshold value during the second duration.

\* \* \* \* \*